(12) United States Patent
Tam (10) Patent No.: US 10,691,632 B1
(45) Date of Patent: Jun. 23, 2020

(54) PERMUTATED RING NETWORK INTERCONNECTED COMPUTING ARCHITECTURE

(71) Applicant: DeGirum Corporation, Menlo Park, CA (US)

(72) Inventor: Kit S. Tam, Menlo Park, CA (US)

(73) Assignee: DeGIRUM Corporation, Campbell, CA (US)

(*) Notice: Subject to any disclaimer, the term of this patent is extended or adjusted under 35 U.S.C. 154(b) by 0 days.

(21) Appl. No.: 16/353,198

(22) Filed: Mar. 14, 2019

(51) Int. Cl.
G06F 17/16 (2006.01)
G06F 15/173 (2006.01)
G06F 15/167 (2006.01)

(52) U.S. Cl.
CPC ...... *G06F 15/17331* (2013.01); *G06F 15/167* (2013.01); *G06F 15/17337* (2013.01); *G06F 15/17375* (2013.01)

(58) Field of Classification Search
CPC ............. G06F 15/17331; G06F 15/167; G06F 15/17375; G06F 15/17337
USPC ........................................................ 709/212
See application file for complete search history.

(56) References Cited

U.S. PATENT DOCUMENTS

| | | | |
|---|---|---|---|
| 4,501,021 A | 2/1985 | Weiss | |
| 6,539,488 B1 | 3/2003 | Tota et al. | |
| 6,657,969 B1 | 12/2003 | Neuendorff et al. | |
| 69,992,975 | 1/2006 | Daniel | |
| 7,149,186 B1 | 12/2006 | Hey | |
| 7,212,490 B1 | 5/2007 | Kao et al. | |
| 7,509,403 B1 | 3/2009 | Lee et al. | |
| 7,710,878 B1 | 5/2010 | Kubat et al. | |
| 10,459,866 B1* | 10/2019 | Fleming, Jr. | G06F 13/4027 |
| 2002/0089977 A1 | 7/2002 | Chang et al. | |
| 2003/0067871 A1 | 4/2003 | Busi et al. | |
| 2005/0152382 A1 | 7/2005 | Stirling et al. | |
| 2006/0072027 A1 | 4/2006 | Shibayama | |
| 2007/0036022 A1 | 2/2007 | Song | |
| 2007/0255874 A1 | 11/2007 | Jennings | |
| 2010/0188972 A1 | 7/2010 | Knapp | |
| 2010/0262788 A1 | 10/2010 | Tsien | |
| 2010/0268844 A1 | 10/2010 | Quinlan et al. | |
| 2010/0268977 A1 | 10/2010 | Chang | |
| 2011/0296110 A1 | 12/2011 | Lilly et al. | |
| 2011/0320854 A1 | 12/2011 | Elrabaa | |
| 2014/0025908 A1* | 1/2014 | Sharma | G06F 12/0607 711/157 |
| 2014/0043343 A1 | 2/2014 | Iwai et al. | |
| 2015/0081934 A1 | 3/2015 | Gupta et al. | |
| 2018/0059183 A1 | 3/2018 | Maeda et al. | |
| 2018/0173534 A1* | 6/2018 | Peled | G06F 9/3806 |

* cited by examiner

*Primary Examiner* — Tu T Nguyen (74) *Attorney, Agent, or Firm* — Bever, Hoffman & Harms, LLP (57) ABSTRACT

A computer architecture that connects a plurality of compute engines and memory banks using one or more permutated ring networks to provide a scalable, high-bandwidth, low-latency point-to-point multi-chip communications solution.

19 Claims, 8 Drawing Sheets

| DATA TRANSPORT STATION (COMM CHANNEL 401) | A0 | A1 | A2 | A3 | A4 | A5 | A6 | A7 | A8 |
|---|---|---|---|---|---|---|---|---|---|
| CONNECTED COMM NODE | $CE_{1A}$ | $M_{1A}$ | $CE_{1C}$ | $M_{1B}$ | $CE_{1D}$ | $M_{1C}$ | $M_{1D}$ | $CN_1$ | $CE_{1B}$ |

| DATA TRANSPORT STATION (COMM CHANNEL 402) | B0 | B1 | B2 | B3 | B4 | B5 | B6 | B7 | B8 |
|---|---|---|---|---|---|---|---|---|---|
| CONNECTED COMM NODE | $M_{1B}$ | $CE_{1B}$ | $M_{1C}$ | $CN_1$ | $M_{1A}$ | $M_{1D}$ | $CE_{1D}$ | $CE_{1C}$ | $CE_{1A}$ |

| DATA TRANSPORT STATION (COMM CHANNEL 403) | C0 | C1 | C2 | C3 | C4 | C5 | C6 | C7 | C8 |
|---|---|---|---|---|---|---|---|---|---|
| CONNECTED COMM NODE | $CE_{1C}$ | $M_{1D}$ | $CE_{1B}$ | $M_{1A}$ | $M_{1B}$ | $CN_1$ | $CE_{1D}$ | $CE_{1A}$ | $M_{1C}$ |

| DATA TRANSPORT STATION (COMM CHANNEL 404) | D0 | D1 | D2 | D3 | D4 | D5 | D6 | D7 | D8 |
|---|---|---|---|---|---|---|---|---|---|
| CONNECTED COMM NODE | $M_{1B}$ | $M_{1A}$ | $CE_{1D}$ | $CE_{1B}$ | $CE_{1C}$ | $CN_1$ | $CE_{1A}$ | $M_{1D}$ | $M_{1C}$ |

| COMM NODE PAIR | # OF HOPS | PATH(S) | COMM NODE PAIR | # OF HOPS | PATH(S) |
|---|---|---|---|---|---|
| $CE_{1A} \leftrightarrow CE_{1B}$ | 1H | A0-A8 | $CE_{1C} \leftrightarrow CE_{1D}$ | 1H | B6-B7 |
| $CE_{1A} \leftrightarrow CE_{1C}$ | 1H | B7-B8 | $CE_{1C} \leftrightarrow CN_1$ | 1H | D4-D5 |
| $CE_{1A} \leftrightarrow CE_{1D}$ | 1H | C6-C7 | $CE_{1C} \leftrightarrow M_{1A}$ | 1H | A1-A2 |
| $CE_{1A} \leftrightarrow CN_1$ | 1H | D5-D6 | $CE_{1C} \leftrightarrow M_{1B}$ | 1H | A2-A3 |
| $CE_{1A} \leftrightarrow M_{1A}$ | 1H | A0-A1 | $CE_{1C} \leftrightarrow M_{1C}$ | 1H | C8-C0 |
| $CE_{1A} \leftrightarrow M_{1B}$ | 1H | B8-B0 | $CE_{1C} \leftrightarrow M_{1D}$ | 1H | C0-C1 |
| $CE_{1A} \leftrightarrow M_{1C}$ | 1H | C7-C8 | $CE_{1D} \leftrightarrow CN_1$ | 1H | C5-C6 |
| $CE_{1A} \leftrightarrow M_{1D}$ | 1H | D6-D7 | $CE_{1D} \leftrightarrow M_{1A}$ | 1H | D1-D2 |
| $CE_{1B} \leftrightarrow CE_{1C}$ | 1H | D3-D4 | $CE_{1D} \leftrightarrow M_{1B}$ | 1H | A3-A4 |
| $CE_{1B} \leftrightarrow CE_{1D}$ | 1H | D2-D3 | $CE_{1D} \leftrightarrow M_{1C}$ | 1H | A4-A5 |
| $CE_{1B} \leftrightarrow CN_1$ | 1H | A7-A8 | $CE_{1D} \leftrightarrow M_{1D}$ | 1H | B5-B6 |
| $CE_{1B} \leftrightarrow M_{1A}$ | 1H | C2-C3 | $CN_1 \leftrightarrow M_{1A}$ | 1H | B3-B4 |
| $CE_{1B} \leftrightarrow M_{1B}$ | 1H | B0-B1 | $CN_1 \leftrightarrow M_{1B}$ | 1H | C4-C5 |
| $CE_{1B} \leftrightarrow M_{1C}$ | 1H | B1-B2 | $CN_1 \leftrightarrow M_{1C}$ | 1H | B2-B3 |
| $CE_{1B} \leftrightarrow M_{1D}$ | 1H | C1-C2 | $CN_1 \leftrightarrow M_{1D}$ | 1H | A6-A7 |

PERMUTATED RING NETWORK INTERCONNECTED COMPUTING ARCHITECTURE

FIELD OF THE INVENTION

The present invention relates to a computer architecture that connects various compute engines using one or more permutated ring networks. More specifically, the present invention relates to a computing architecture that uses a plurality of interconnected permutated ring networks, which provide a scalable, high-bandwidth, low-latency point-to-point multi-chip communications solution.

BACKGROUND

Figure 1:
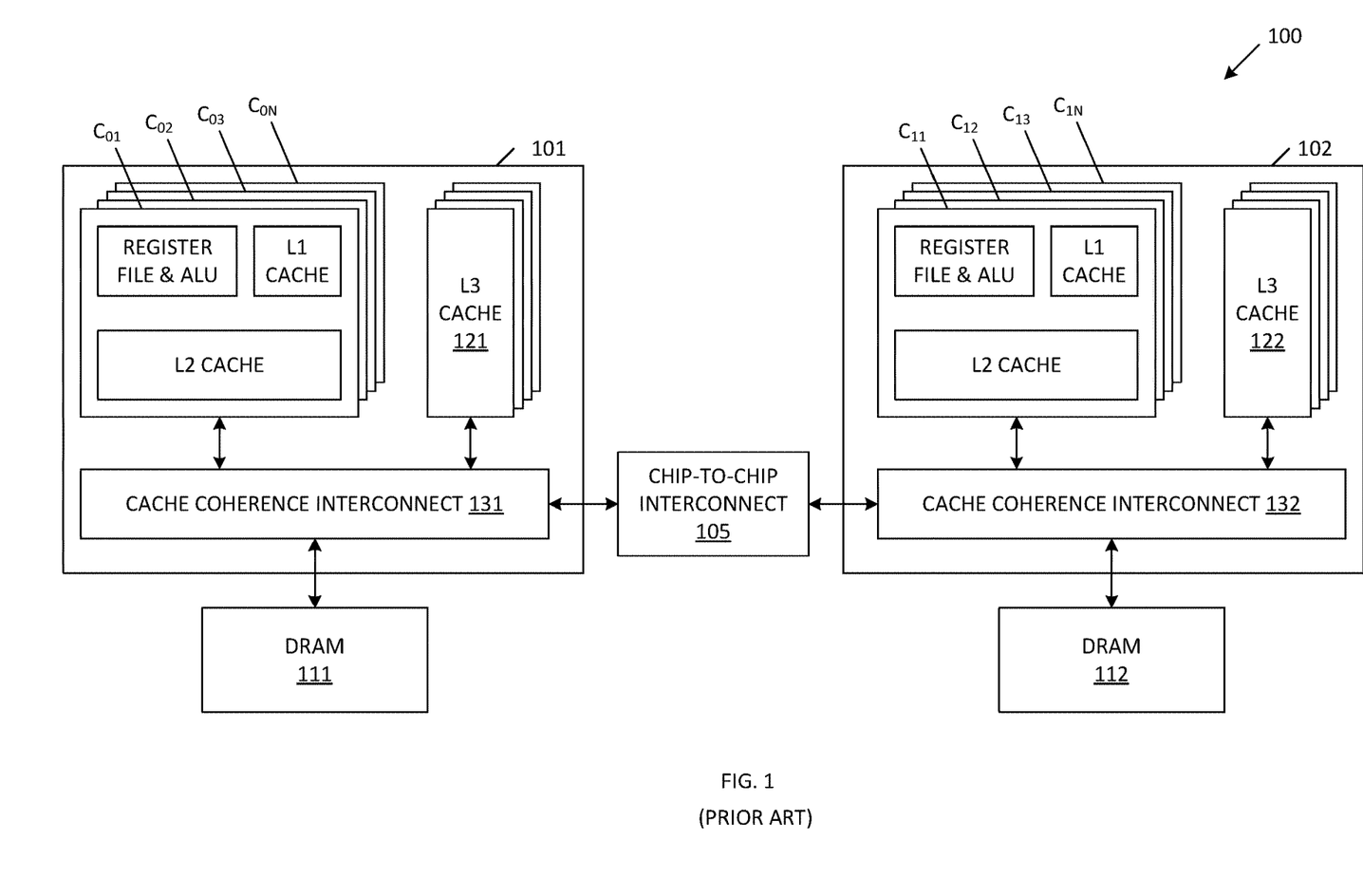
FIG. 1 is a block diagram of a conventional computer architecture that is optimized for a shared memory programming model.

FIG. 1 is a block diagram of a conventional CPU architecture 100 that includes a plurality of processor chips 101-102, a chip-to-chip interconnect 105 and DRAM devices 111-112. Each of the processor chips 101 and 102 includes a plurality of processor cores $C_{01}$-$C_{0N}$ and $C_{11}$-$C_{1N}$, respectively. Each of the processor cores includes a register file and arithmetic logic unit (ALU), a first level cache memory L1, and a second level cache memory L2. Each of the processor chips 101 and 102 also includes a plurality of third level (L3) cache memories 121 and 122, respectively, and cache coherence interconnect logic 131 and 132, respectively.

In general, the first level cache memory L1 allows for fast data access (1-2 cycles), but is relatively small. The second level cache memory L2 exhibits slower data access (5-6 cycles), but is larger than the first level cache memory. Each of the processor cores $C_{01}$-$C_{0N}$ and $C_{11}$-$C_{1N}$ has its own dedicated first level cache memory L1 and second level cache memory L2. Each of the processor cores $C_{01}$-$C_{0N}$ on chip 101 accesses the plurality of level three (L3) cache memories 121 through cache coherence interconnect logic 131. Similarly, each of the processor cores $C_{11}$-$C_{1N}$ on chip 102 accesses the plurality of level three (L3) cache memories 122 through cache coherence interconnect logic 132. Thus, the plurality of processor cores on each chip share the plurality of level three (L3) cache memories on the same chip.

Each of the processor cores $C_{01}$-$C_{0N}$ on chip 101 accesses the DRAM 111 through cache coherence interconnect logic 131. Similarly, each of the processor cores $C_{11}$-$C_{1N}$ on chip 102 accesses the DRAM 112 through cache coherence interconnect logic 132.

Cache coherence interconnect logic 131 ensures that all of the processor cores $C_{01}$-$C_{0N}$ see the same data at the same entry of the level three (L3) cache 121. Cache coherence interconnect logic 131 resolves any 'multiple writer' problems, wherein more than one of the processor cores $C_{01}$-$C_{0N}$ attempts to update the data stored by the same entry of the level three (L3) cache 121. Any of the processor cores $C_{01}$-$C_{0N}$ that wants to change data in the level three (L3) cache 121 must first obtain permission from the cache coherence interconnect logic 131. Obtaining this permission undesirably requires a long time and involves the implementation of a complicated message exchange. Cache coherence interconnect logic 131 also ensures coherence of the data read from/written to DRAM 111.

Cache coherence interconnect logic 132 similarly ensures coherence of the data stored by the L3 cache 122 and data read from/written to DRAM 112.

Chip-to-chip interconnect logic 105 enables communication between the processor chips 101-102, wherein this logic 105 handles necessary changes of protocols across the chip boundaries.

As illustrated by FIG. 1, conventional CPU architecture 100 implements a plurality of cache levels (L1, L2 and L3) that have a cache hierarchy. Higher level cache memories have a relatively small capacity and a relatively fast access speed (e.g., SRAM), while lower level cache memories have a relatively large capacity and a relatively slow access speed (e.g., DRAM). A cache coherence protocol is required to maintain data coherence across the various cache levels. The cache hierarchy makes it difficult to share data among multiple different processor cores $C_{01}$-$C_{0N}$ and $C_{11}$-$C_{1N}$ due to the use of dedicated primary (L1 and L2) caches, multiple accesses controlled by cache coherence policies, and the required traversal of data across different physical networks (e.g., between processor chips 101 and 102).

Cache hierarchy is based on the principle of temporal and spatial locality, so that higher level caches will hold the displaced cache lines from lower level caches in order to avoid long latency accesses in the case where the data will be accessed in the future. However, if there is minimal spatial and temporal locality in the data set (as is the case in for many neural network data sets), then latency is increased, the size of the useful memory locations is reduced, and the number of unnecessary memory accesses is increased.

The hardware of conventional CPU architectures (such as architecture 100) is optimized for the Shared Memory Programming Model. In this model, multiple compute engines communicate via memory sharing using a cache coherence protocol. However, these conventional CPU architectures are not the most efficient way to support a Producer-Consumer execution model, which is typically implemented by the forward propagation of a neural network (which exhibits redundant memory read and write operations as well as a long latency). In a Producer-Consumer execution model, the passing of direct messages from producers to consumers is more efficient. In contrast, there is no hardware support for direct communication among the processor cores $C_{01}$-$C_{0N}$ and $C_{11}$-$C_{1N}$ in the Shared Memory Programming Model. The Shared Memory Programming model relies on software to build the message passing programming model.

The communication channels at each level of a conventional CPU architecture 100 optimized for the Shared Memory Programming Model are highly specialized and optimized for the subsystems being served. For example, there are specialized interconnect systems: (1) between the data caches and the ALU/register file, (2) between different levels of caches, (3) to the DRAM channels, and (4) in the chip-to-chip interconnect 105. Each of these interconnect systems operates at its own protocol and speed. Consequently, there is significant overhead required to communicate across these channels. This incurs significant inefficiency when trying to speed up tasks that require access to a large amount of data (e.g., a large matrix multiplication that uses a plurality of computing engines to perform the task).

Crossbar switches and simple ring networks are commonly used to implement the above-described specialized interconnect systems. However, the speed, power efficiency and scalability of these interconnect structures are limited.

As described above, conventional CPU architectures have several inherent limitations in the implementation of neural networks and machine learning applications. It would therefore be desirable to have an improved computing system architecture that is able to more efficiently process data in neural network/machine learning applications. It would further be desirable to have an improved network topology capable of spanning multiple chips, without requiring cache coherency protocol between the multiple chips. It would further be desirable if such a multi-chip communication system to be easily scalable, capable of providing communication between many different chips.

SUMMARY

Accordingly, the present invention provides a computer architecture that includes a plurality of computing slices, each including a plurality of compute engines, a plurality of memory banks, a communication node and a first-level interconnect structure. The first-level interconnect structure couples each of the plurality of compute engines, the plurality of memory banks and the communication node. The first-level interconnect enables each of the compute engines to access each of the memory banks within the same computing slice. In one embodiment, the first-level interconnect structure is a permutated ring network. However, in other embodiments, the first-level interconnect structure can be implemented using other structures, such as a crossbar switch or a simple ring network.

The computer architecture also includes a second-level interconnect structure that includes a permutated ring network. As defined herein, a permutated ring network includes a plurality of bi-directional source-synchronous ring networks, each including a plurality of data transport stations. Each communication node of the plurality of computing slices is coupled to one of the data transport stations in each of the plurality of bi-directional source-synchronous ring networks. The second-level interconnect structure enables access between each of the computing slices coupled to the second level interconnect structure.

The computer architecture can further include a memory interface communication node coupled to the second-level interconnect structure, wherein the memory interface communication node is coupled to one of the data transport stations in each of the plurality of bi-directional source-synchronous ring networks of the second-level interconnect structure. In this embodiment, an external memory device (e.g., DRAM device) is coupled to the memory interface communication node.

The computer architecture can further include a first network communication node coupled to the second-level interconnect structure, wherein the first network communication node is coupled to one of the data transport stations in each of the plurality of bi-directional source-synchronous ring networks of the second-level interconnect structure. In this embodiment, the first network communication node is coupled to a system-level interconnect structure.

The system-level interconnect structure may include a plurality of network communication nodes coupled to a third-level interconnect structure. A first one of these plurality of network communication nodes may be coupled to the first network communication node. A second one of these plurality of network communication nodes may be coupled to a host system processor. A third one of these plurality of network communication nodes may be coupled to a system memory. A fourth one of these plurality of network communication nodes may be coupled to another second-level interconnect structure, which in turn, is coupled to another plurality of computing slices. The third-level interconnect structure can be implemented by a permutated ring network, or by another structure, such as a crossbar switch or simple ring network.

Advantageously, if the first, second and third level of interconnect structures are all implemented using permutated ring networks, messages and data can be transmitted/received on the computer architecture using a single messaging protocol. Address mapping ensures that each of the devices (e.g., compute engines, memory banks, DRAM devices) have a unique address within the computer architecture.

In a particular embodiment, the second level interconnect structure and the corresponding plurality of computing slices are fabricated on the same semiconductor chip.

The present invention will be more fully understood in view of the following description and drawings.

DETAILED DESCRIPTION

The present invention uses a permutated ring network (PRN) architecture to provide a better solution for the interconnect systems of a machine learning computing system. The PRN architecture includes a flat memory hierarchy, which allows compute engines on different chips (and on the same chip) to communicate directly among one another using a common communication protocol. The interconnect system is non-cache coherent. In one embodiment, the interconnect system uses a single interconnect structure (i.e., a plurality of permutated ring networks).

In an alternate embodiment, a PRN structures are used only at specific locations within the interconnect structure (e.g., to connect a plurality of computing slices on the same chip).

Figure 2:
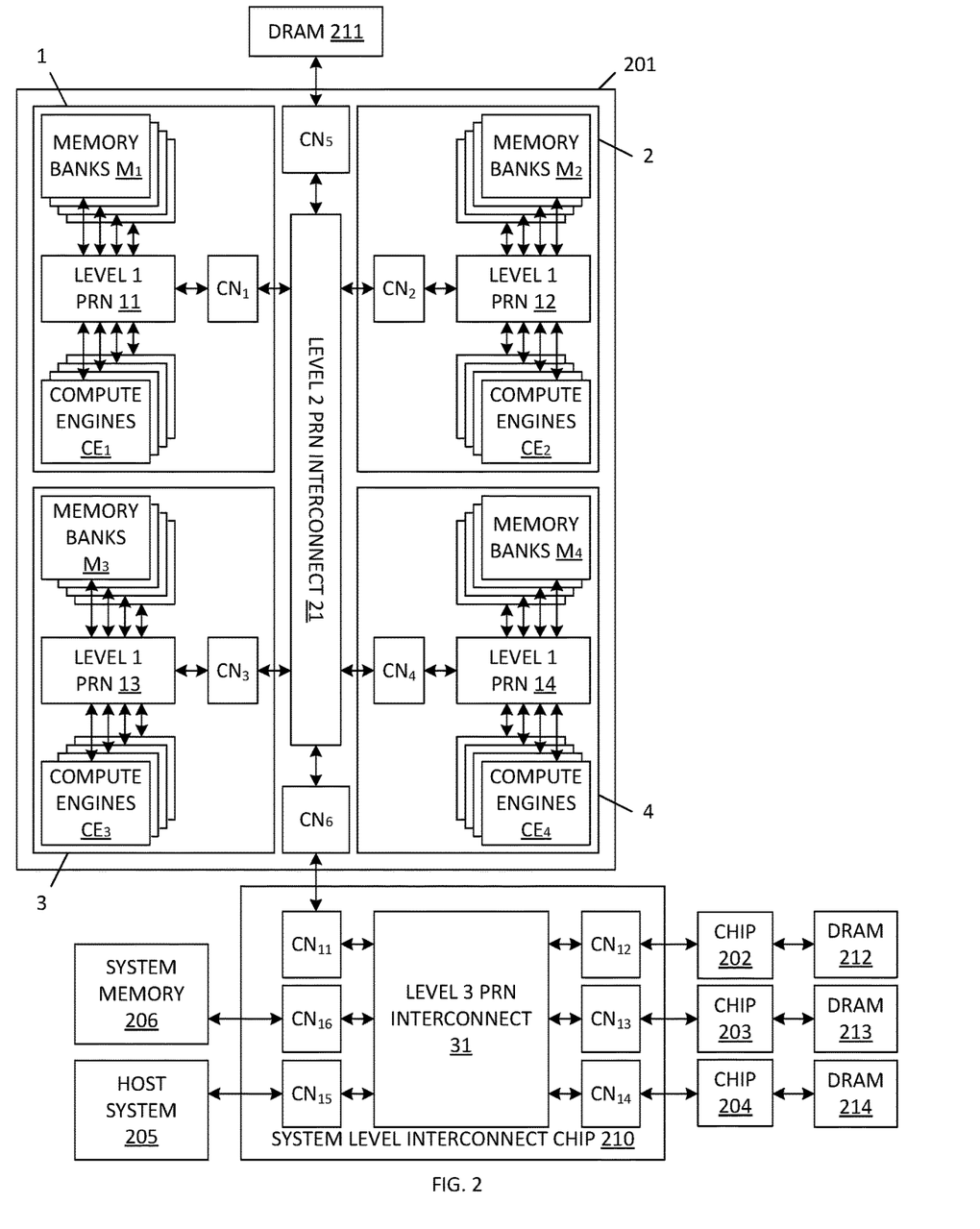
FIG. 2 is a block diagram of a computer architecture that uses permutated ring networks to connect a plurality of compute engines and memory devices, in accordance with one embodiment of the present invention.

FIG. 2 is a block diagram of a computer system 200 in accordance with one embodiment of the present invention. Computer system 200 includes a plurality of processor chips 201-204, host processor system 205, system memory 206, system level interconnect chip 210 and DRAM devices 211-214. Although only four processor chips 201-204 are illustrated in FIG. 2, it is understood that computer system 200 can be easily modified to include other numbers of processor chips in other embodiments. Moreover, although only processor chip 201 is illustrated in detail in FIG. 2, it is understood that processor chips 202-204 include the same internal elements as the processor chip 201 in the described embodiments. In alternate embodiments, the processor chips 201-204 can include different numbers of computing slices, compute engines and/or memory banks, in accordance with the descriptions provided below.

In the illustrated embodiment, processor chip 201 includes four computing slices 1, 2, 3, and 4, and a permutated ring network (PRN) based interconnect structure 21. Although four slices are illustrated in FIG. 2, it is understood that other numbers of slices can be included on processor chip 201 in other embodiments. Each slice includes a plurality of compute engines, a plurality of memory banks, a communication node and a first level PRN-based interconnect structure. More specifically, slices 1, 2, 3 and 4 include compute engine sets $CE_1$, $CE_2$, $CE_3$ and $CE_4$, respectively, memory bank sets $M_1$, $M_2$, $M_3$ and $M_4$, respectively, first level PRN-based interconnect structures 11, 12, 13 and 14, respectively, and communication nodes $CN_1$, $CN_2$, $CN_3$ and $CN_4$, respectively. Each of the compute engine sets $CE_1$, $CE_2$, $CE_3$ and $CE_4$ includes a plurality of compute engines (e.g., local processors). Each of the compute engine sets $CE_1$, $CE_2$, $CE_3$ and $CE_4$ includes four compute engines in the illustrated example. However, it is understood that other numbers of compute engines can be included in each compute engine set in other embodiments. Similarly, each of the memory bank sets $M_1$, $M_2$, $M_3$ and $M_4$ includes a plurality of memory banks. Each of the memory bank sets includes four memory banks in the illustrated example. However, it is understood that other numbers of memory banks can be included in each memory bank set in other embodiments. In one embodiment, each of the memory banks in memory bank sets $M_1$, $M_2$, $M_3$ and $M_4$ is a static random access memory (SRAM), which enables relatively fast memory accesses to be implemented.

Within each of the computing slices 1, 2, 3 and 4, the corresponding first level PRN-based interconnect structures 11, 12, 13 and 14 couple the corresponding compute engine sets $CE_1$, $CE_2$, $CE_3$ and $CE_4$ and the corresponding memory bank sets $M_1$, $M_2$, $M_3$ and $M_4$. This allows each of the compute engines to access each of the memory banks within the same slice using the corresponding first level PRN-based interconnect structure. For example, each of the four compute engines in the compute engine set $CE_1$ of computing slice 1 is able to access each of the four memory banks of the memory bank set $M_1$ of computing slice 1 through the corresponding first level PRN-based interconnect structure 11 of slice 1.

The first level PRN-based interconnect structures 11, 12, 13 and 14, are also coupled to corresponding communication nodes $CN_1$, $CN_2$, $CN_3$ and $CN_4$, within the corresponding slices 1, 2, 3 and 4. The communication nodes $CN_1$, $CN_2$, $CN_3$ and $CN_4$ are coupled to the second level PRN-based interconnect structure 21. As described in more detail below, the communication nodes $CN_1$, $CN_2$, $CN_3$ and $CN_4$ pass messages and data between the corresponding first level PRN-based interconnect structures 11, 12, 13 and 14 and the second level PRN-based interconnect structure 21.

This configuration allows each of the compute engines on processor chip 201 to access each of the memory banks on the processor chip 201 using the first level PRN-based interconnect structures 11-14 and the second level PRN-based interconnect structure 21 (if necessary). For example, each of the compute engines in the compute engine set $CE_1$ of computing slice 1 is able to access each of the memory banks of the memory bank set $M_4$ of slice 4 through a path that includes: the corresponding first level PRN-based interconnect structure 11 of computing slice 1, the communication node $CN_1$, the second level PRN-based interconnect structure 21, the communication node $CN_4$, and the first level PRN-based interconnect structure 14 of computing slice 4.

This configuration also allows each of the compute engines on processor chip 201 to communicate with each of the other compute engines on the processor chip 201 using the first level PRN-based interconnect structures 11-14 and the second level PRN-based interconnect structure 21 (if necessary). For example, each of the compute engines in the compute engine set $CE_2$ of computing slice 2 is able to communicate with each of the compute engines in the compute engine set $CE_3$ of computing slice 3 through a path that includes: the corresponding first level PRN-based interconnect structure 12 of slice 2, the communication node $CN_2$, the second level PRN-based interconnect structure 21, the communication node $CN_3$, and the first level PRN-based interconnect structure 13 of slice 3.

The second level PRN-based interconnect structure 21 is also coupled to external DRAM 211 through memory interface communication node $CN_5$. This configuration allows each of the compute engines of processor chip 201 to access the DRAM 211 through the first level PRN-based interconnect structures 11-14 and the second level PRN-based interconnect structure 21. For example, each of the compute engines in the compute engine set $CE_1$ of computing slice 1 is able to access DRAM 211 through a path that includes: the corresponding first level PRN-based interconnect structure 11 of computing slice 1, the communication node $CN_1$, the second level PRN-based interconnect structure 21 and the communication node $CN_5$.

The computer system 200 of FIG. 2 also includes a third level PRN-based interconnect structure 31, which is fabricated on system level interconnect chip 210. The third level PRN-based interconnect structure 31 is coupled to a plurality of communication nodes $CN_{11}$-$CN_{16}$ on chip 210. As described in more detail below, the third level PRN-based interconnect structure 31 enables the transmission of messages and data between the communication nodes $CN_{11}$-$CN_{16}$. Communication nodes $CN_{11}$, $CN_{12}$, $CN_{13}$ and $CN_{14}$ are coupled to processor chips 201, 202, 203 and 204, respectively. Communication nodes $CN_{15}$ and $CN_{16}$ are coupled to host system processor 205 and system memory 206, respectively.

The system level interconnect chip 210 allows for the transmission of data and messages between host system processor 205, system memory 206 and each of the processor chips 201-204. More specifically, host processor 205 can communicate with any of the compute engines on processor chips 201-204 or any of the memory banks on processor chips 201-204. For example, host processor 205 is able to access the compute engines in the compute engine set $CE_1$ of computing slice 1 (or the memory banks of the memory bank set $M_1$ of computing slice 1) through a path that includes: communication node $CN_{15}$, the third level PRN-based interconnect structure 31, network communication nodes $CN_{11}$ and $CN_6$, second level PRN-based interconnect structure 21, communication node $CN_1$ and first level PRN-based interconnect structure 11.

Host processor 205 can also communicate with any of the DRAMs 211-214. For example, host processor 205 is able to access the DRAM 211 through a path that includes: communication node $CN_{15}$, the third level PRN-based interconnect structure 31, network communication nodes $CN_{11}$ and $CN_6$, second level PRN-based interconnect structure 21 and communication node $CN_5$. Host processor 205 can access DRAMs 212-214 through similar paths in processor chips 202-204, respectively.

Host processor 205 can also communicate with the system memory 206 through a path that includes: communication node $CN_{15}$, the third level PRN-based interconnect structure 31 and communication node $CN_{16}$.

In addition, each of the compute engines on any of the processor chips 201-204 can communicate with any of the compute engines or memory banks on any of the other processor chips 201-204, as well as the DRAMs 211-214 coupled to these other processor chips.

In accordance with one embodiment, the various memory banks, compute engines and communication nodes located on processor chips 201-204, DRAMs 211-214, host system 205, system memory 206 and the communication nodes $CN_{11}$-$CN_{16}$ on system level interconnect chip 210 are assigned unique system addresses, thereby enabling each of these system elements to be easily addressed by (and therefore communicate with) any of the other system elements.

Figure 3:
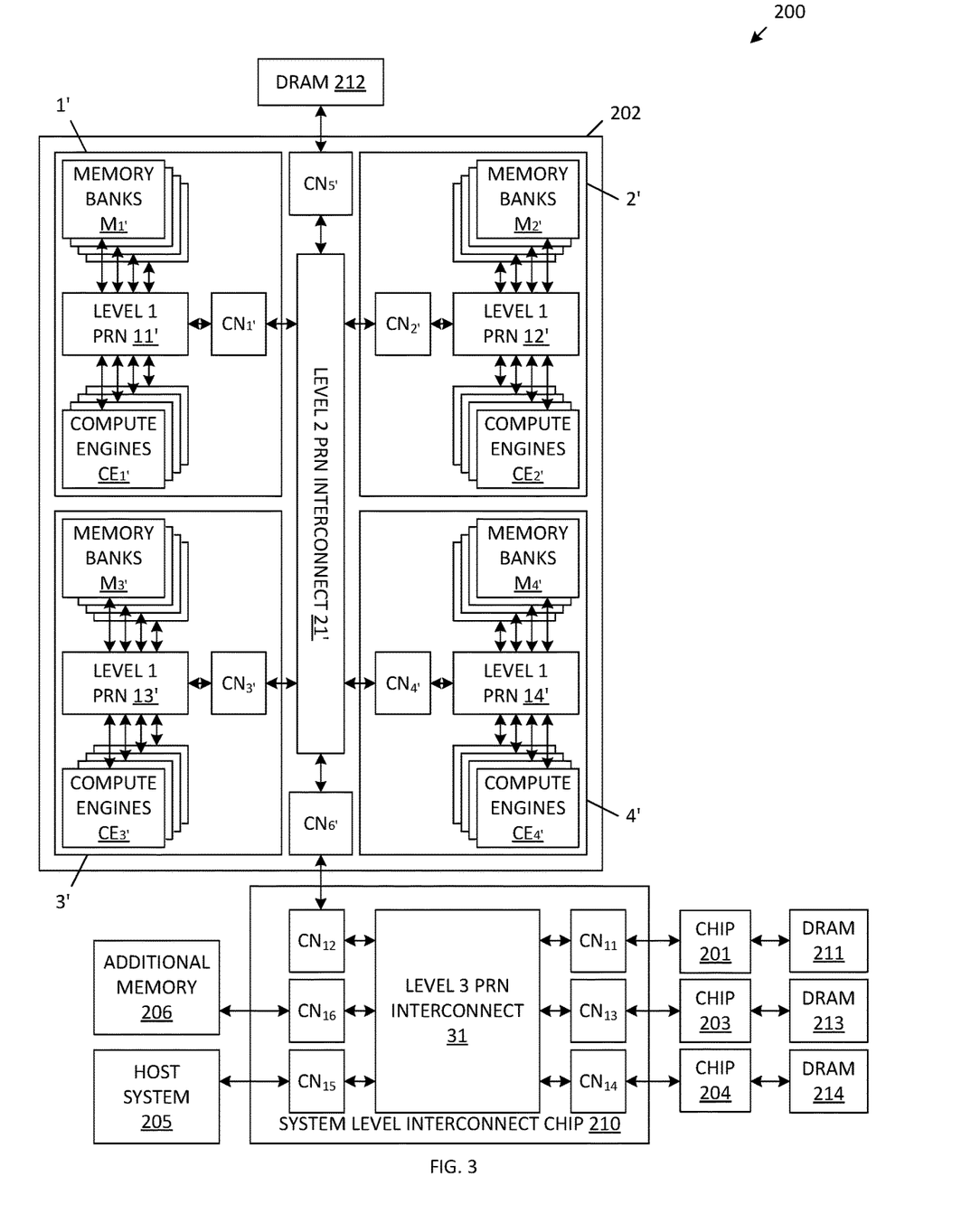
FIG. 3 is a modified view of the computer architecture of FIG. 2 in accordance with one embodiment of the present invention.

FIG. 3 is a block diagram of PRN-based computer system 200, which shows processor chip 202 in detail. Similar elements in processor chips 201 and 202 are labeled with similar reference numbers. Thus, processor chip 202 includes computing slices 1', 2', 3' and 4', which include memory bank sets $M_{1'}$, $M_{2'}$, $M_{3'}$, $M_{4'}$, respectively, compute engine sets $CE_{1'}$, $CE_{2'}$, $CE_{3'}$, and $CE_{4'}$, respectively, first level PRN-based interconnect structures 11', 12', 13' and 14', respectively, and communication nodes $CN_{1'}$, $CN_{2'}$, $CN_{3'}$ and $CN_{4'}$, respectively. Processor chip 202 also includes second level PRN-based interconnect structure 21', memory interface communication node $CN_{5'}$ and network communication node $CN_{6'}$, which are coupled to DRAM 212 and network communication node $CN_{12}$, respectively.

This configuration allows each of the compute engines in the compute engine set $CE_1$ (of processor chip 201) to access each of the compute engines in the compute engine set $CE_{3'}$ (of processor chip 202) through a path that includes: first level PRN-based interconnect structure 11, communication node $CN_1$, second level PRN-based interconnect structure 21, network communication nodes $CN_6$ and $CN_{11}$, the third level PRN-based interconnect structure 31, network communication nodes $CN_{12}$ and $CN_{6'}$, second level PRN-based interconnect structure 21', communication node $CN_{3'}$, and first level PRN-based interconnect structure 13'. Similarly, each of the compute engines in the compute engine set $CE_1$ (of processor chip 201) is able to access each of the memory banks in the memory bank set $M_{3'}$ (of processor chip 202) using the same path.

This configuration also allows each of the compute engines of each processor chip to access the DRAMs coupled to the other processor chips. For example, each of the compute engines in the compute engine set $CE_1$ of slice 1 (of processor chip 201) is able to access the DRAM 212 (coupled to processor chip 202) through a path that includes: the corresponding first level PRN-based interconnect structure 11 of slice 1, the communication node $CN_1$, the second level PRN-based interconnect structure 21, communication nodes $CN_6$ and $CN_{11}$, the third level PRN-based interconnect structure 31, communication nodes $CN_{12}$ and $CN_{6'}$, second level PRN-based interconnect structure 21', and communication node $CN_{5'}$.

As described above, the PRNA interconnected computer system 200 has three levels of hierarchies, including slice level, chip level and system level, wherein each level is defined by its physical construction boundary.

The slice level, represented by computing slices 1-4 (and computing slices 1'-4'), is the basic building block of the computer system 200. Each computing slice, by itself, can be implemented as a small scale machine learning processor via a bridge between the host system processor 205 and the first level PRN-based interconnect structure.

The chip level, represented by processor chips 201-204, is defined by the subsystems included on a die, including a plurality of computing slices and the corresponding second level PRN-based interconnect structure. Each processor chip can be implemented as a medium scale machine learning system via a bridge between the host system processor 205 and the second level PRN based interconnect structures.

The system level, which includes the host system processor 205, is built on a plurality of processor chips and the system level interconnect chip 210. The processor chips 201-204 communicate through the system level interconnect chip 210. The third level PRN-based interconnect structure 31 implemented by the system level interconnect chip 210 advantageously operates with a high bandwidth, a low latency and a high power efficiency. By implementing the first, second and third level interconnect structures using permutated ring networks, the same communication protocol can be maintained across the entire system. This greatly simplifies the shared memory and message passing protocols across the system. As described above, computer system 200 enables any compute engine to access all of the memory bank sets (e.g., memory bank sets M1-M4 and M1'-M4') and all of the DRAMs (e.g., DRAMs 211-214) in the system 200 via the PRN-based interconnect structures. Hence, computer system 200 is a highly flexible shared memory computing system.

Moreover, all of the compute engines of computer system 200 can communicate directly among each other via the PRN-based interconnect structures. Advantageously, software support is not required to translate messages exchanged between compute engines of different computing slices or chips, thereby resulting in a highly efficient message passing computing system.

The PRN-based interconnect structure used to implement the level 1, level 2 and level 3 PRN interconnect structures of FIGS. 2 and 3 is described in more detail in commonly owned, co-pending U.S. Published Patent Application No. 2018/0145850, which is incorporated by reference in its entirety. The use of PRN interconnect structures in computer system 200 accordance with various embodiments is described in more detail below.

Figure 4:
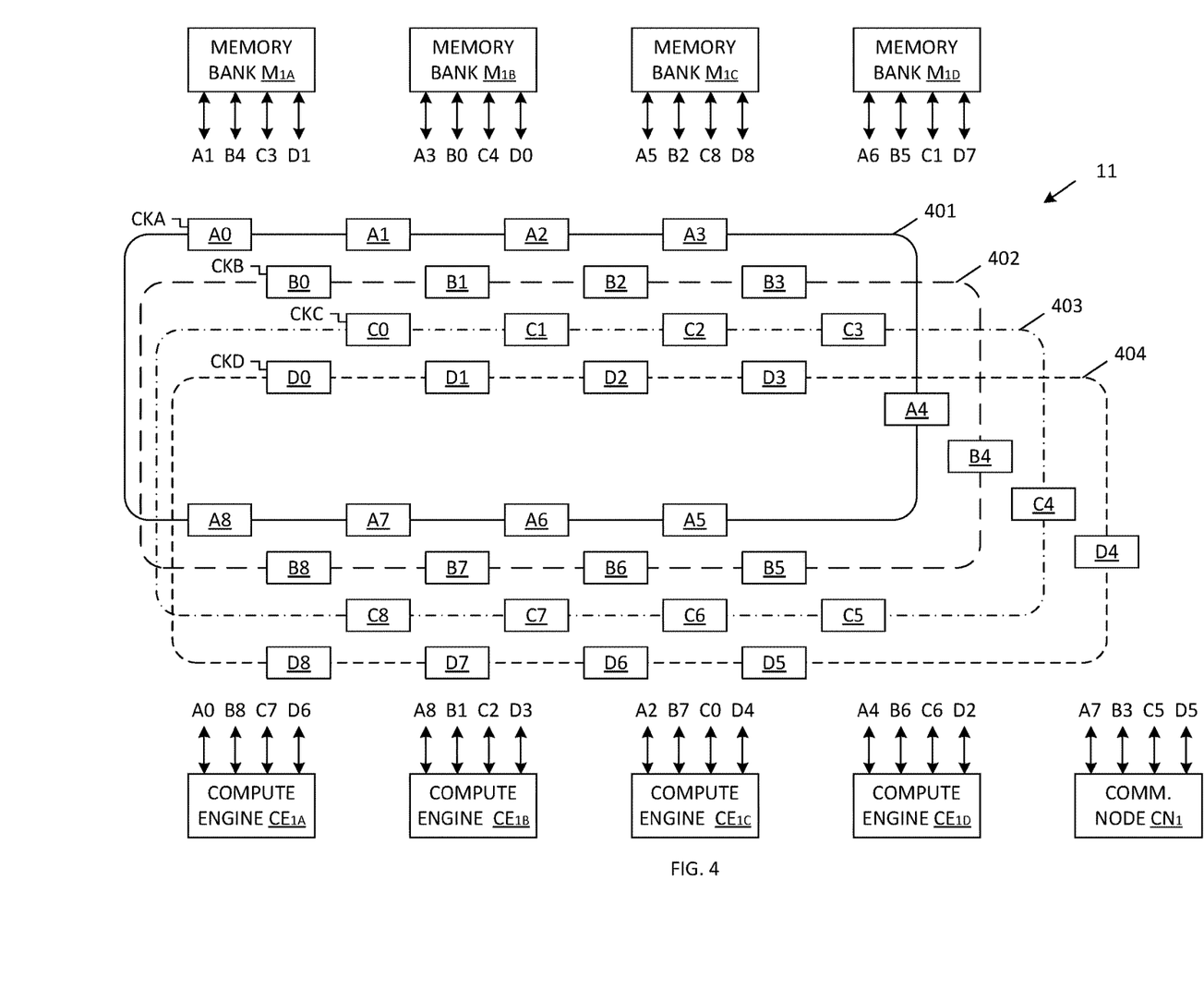
FIG. 4 is a block diagram of first level permutated ring network used in the computer architecture of FIGS. 2-3 in accordance with one embodiment of the present invention.

FIG. 4 is a block diagram of first level permutated ring network 11 in accordance with one embodiment of the present invention. The other first level permutated ring networks of computer system 200 (e.g., permutated ring networks 12-14 and 11'-14') may be identical to first level permutated ring network 11. In the illustrated embodiment, first level permutated ring network 11 includes four bi-directional source synchronous ring networks 401, 402, 403 and 404. Each of the ring networks 401-404 functions as a communication channel. Although the illustrated permutated ring network 11 includes nine communication nodes (i.e., communication node $CN_1$, compute engines $CE_{1A}$, $CE_{1B}$, $CE_{1C}$ and $CE_{1D}$ of compute engine set $CE_1$ and memory banks $M_{1A}$, $M_{1B}$, $M_{1C}$ and $M_{1D}$ of memory bank set $M_1$) and four communication channels 401-404, it is understood that other numbers of communication nodes and communication channels can be used in other embodiments. In general, the number of communication nodes in the first level permutated ring network 11 is identified by the value, N, and the number of bi-directional ring networks in the first level permutated ring network 11 is identified by the value M. The number of communication channels (M) is selected to provide an appropriate tradeoff between the bandwidth requirements of the communication network and the area-power constraints of the communication network.

Each of the communication channels 401-404 includes a plurality of data transport stations connected by bi-directional links (interconnects). More specifically, communication channel 401 includes nine data transport stations A0-A8, communication channel 402 includes nine data transport stations B0-B8, communication channel 403 includes nine data transport stations C0-C8 and communication channel 404 includes nine data transport stations D0-D8. The bi-directional links of communication channel 401 are shown as solid lines that connect the data transport stations A0-A8 in a ring. The bi-directional links of communication channel 402 are shown as long dashed lines that connect the data transport stations B0-B8 in a ring. The bi-directional links of communication channel 403 are shown as dashed-dotted lines that connect the data transport stations C0-C8 in a ring. The bi-directional links of communication channel 404 are shown as short dashed lines that connect the data transport stations D0-D8 in a ring. The bi-directional links allow for the simultaneous transmission of data and clock signals in both the clockwise and counterclockwise directions.

In general, each of the data transport stations A0-A8, B0-B8, C0-C8 and D0-D8 provides an interface that enables the transfer of data between the nine communication nodes and the communication channels 401-404.

In general, each of the communication channels 401-404 is coupled to receive a master clock signal. Thus, in the example of FIG. 4, communication channels 401, 402, 403 and 404 are coupled to receive master clock signals CKA, CKB, CKC and CKD, respectively. In the embodiment illustrated, data transport stations A0, B0, C0 and D0 are coupled to receive the master clock signals CKA, CKB, CKC and CKD, respectively. However, in other embodiments, other data transport stations in communication channels 401, 402, 403 and 404 can be coupled to receive the master clock signals CKA, CKB, CKC and CKD, respectively. Although four separate master clock signals CKA, CKB, CKC and CKD are illustrated, it is understood that each of the master clock signals CKA, CKB, CKC and CKD can be derived from a single master clock signal. In the described embodiments, each of the master clock signals CKA, CKB, CKC and CKD have the same frequency.

Conventional clock generation circuitry (e.g., a phase locked loop circuit) can be used to generate the master clock signals CKA, CKB, CKC and CKD. In the described embodiments, the master clock signals can have a frequency of about 5 GHz or more. However, it is understood that the master clock signals can have other frequencies in other embodiments. The frequency and voltage of the master clock signals can be scaled based on the bandwidth demands and power optimization of the ring network architecture. In the illustrated embodiments, data transport stations A0, B0, C0 and D0 receive the master clock signals CKA, CKB, CKC and CKD, respectively. Each of the other data transport stations receives its clock signal from its adjacent neighbor. That is, the master clock signals CKA, CKB, CKC and CKD are effectively transmitted to each of the data transport stations of communication channels 401, 402, 402 and 404, respectively, in series.

Each of the communication channels 401, 402, 403 and 404 operates in a source synchronous manner with respect to its corresponding master clock signal CKA, CKB, CKC and CKD, respectively.

In general, each data transport station can transmit output messages on two paths. In the first path, a message received by from an upstream data transport station is forwarded to a downstream data transport station (e.g., data transport station A0 may forward a message received from downstream data transport station A8 to upstream data transport station A1 on the clockwise path, or data transport station A0 may forward a message received from downstream data transport station A1 to upstream data transport station A8 on the counterclockwise path). In the second path, a message provided by a communication node coupled to the data transport station is routed to a downstream data transport station (e.g., data transport station A0 may forward a message received from compute engine $CE_{1A}$ to downstream data transport station A1 on the clockwise path, or to downstream data transport station A8 on the counterclockwise path). Also in the second path, a message received by a data transport station is routed to an addressed communication node (e.g., data transport station A0 may forward a message received from downstream data transport station A8 on the clockwise path to compute engine $CE_{1A}$, or data transport station A0 may forward a message received from downstream data transport station A0 on the counterclockwise path to compute engine $CE_{1A}$). Note that the wires and buffers used to transmit the clock signals and the messages between the data transport stations are highly equalized and balanced in order to minimize setup and hold time loss.

The clock signal path and the message bus operate as a wave pipeline system, wherein messages transmitted between data transport stations are latched into the receiving data transport station in a source-synchronous manner using the clock signal transmitted on the clock signal path. In this manner, messages are transmitted between data transport stations at the frequency of the master clock signals CKA, CKB, CKC and CKD, allowing for fast data transfer between data transport stations.

Because point-to-point source-synchronous communication is implemented, the wire and buffer delays of the clock signal line structure and the message bus structure will not degrade the operating frequency of the communication channels 401-404.

Because the data transport stations have a relatively simple design, the transmission of messages on the permutated ring network 11 can be performed at a relatively high frequency. Communication node $CN_1$, compute engines $CE_{1A}$, $CE_{1B}$, $CE_{1C}$ and $CE_{1D}$, and memory banks $M_{1A}$, $M_{1B}$, $M_{1C}$ and $M_{1D}$ typically include a more complicated design, and may operate at a slower frequency than the frequency of the master clock signals CKA, CKB, CKC and CKD.

Note that the circular configuration of the communication channels 401-404 necessitates that messages received by the originating data transport stations A0, B0, C0 and D0 (e.g., the data transport stations that receive the master clock signals CKA, CKB, CKC and CKD) must be resynchronized to the master clock signals CKA, CKB, CKC and CKD, respectively. In one embodiment, resynchronization circuitry (not shown) performs this synchronizing operation by latching the incoming message into a first flip-flop in response to the incoming clock signal received from a downstream data transport station. The message provided at the output of this first flip-flop is then latched into a second flip flop in response to the master clock signal (e.g., CKA). The second flip-flop provides the synchronized message to the originating data transport station (e.g., data transport station A0). This synchronized message is stored in the originating data transport station (A0) in response to the master clock signal (CKA).

Returning now to the topography of the first level permutated ring network 11, each of the communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$ is coupled to a unique one of the data transport stations A0-A8, B0-B8, C0-C8 and D0-D8 in each of the four communication channels 401-404. For example, compute engine $CE_{1A}$ is connected to data transport station A0 in communication channel 401, data transport station B8 in communication channel 402, data transport station C7 in communication channel 403 and data transport station D6 in communication channel 404. Table 1 below defines the connections between communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$, and the data transport stations A0-A8, B0-B8, C0-C8 and D0-D8 in accordance with one embodiment. Note that the physical connections between communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$, and the data transport stations A0-A8, B0-B8 and C0-C8 are not explicitly shown in FIG. 4 for clarity.

TABLE 1

| NODE | DATA TRANSPORT STATION IN COMM CHANNEL 401 | DATA TRANSPORT STATION IN COMM CHANNEL 402 | DATA TRANSPORT STATION IN COMM CHANNEL 403 | DATA TRANSPORT STATION IN COMM CHANNEL 404 |
|---|---|---|---|---|
| $CE_{1A}$ | A0 | B8 | C7 | D6 |
| $CE_{1B}$ | A8 | B1 | C2 | D3 |
| $CE_{1C}$ | A2 | B7 | C0 | D4 |
| $CE_{1D}$ | A4 | B6 | C6 | D2 |
| $M_{1A}$ | A1 | B4 | C3 | D1 |
| $M_{1B}$ | A3 | B0 | C4 | D0 |
| $M_{1C}$ | A | B2 | C8 | D8 |
| $M_{1D}$ | A6 | B5 | C1 | D7 |
| CN1 | A7 | B3 | C5 | D5 |

Figure 5:
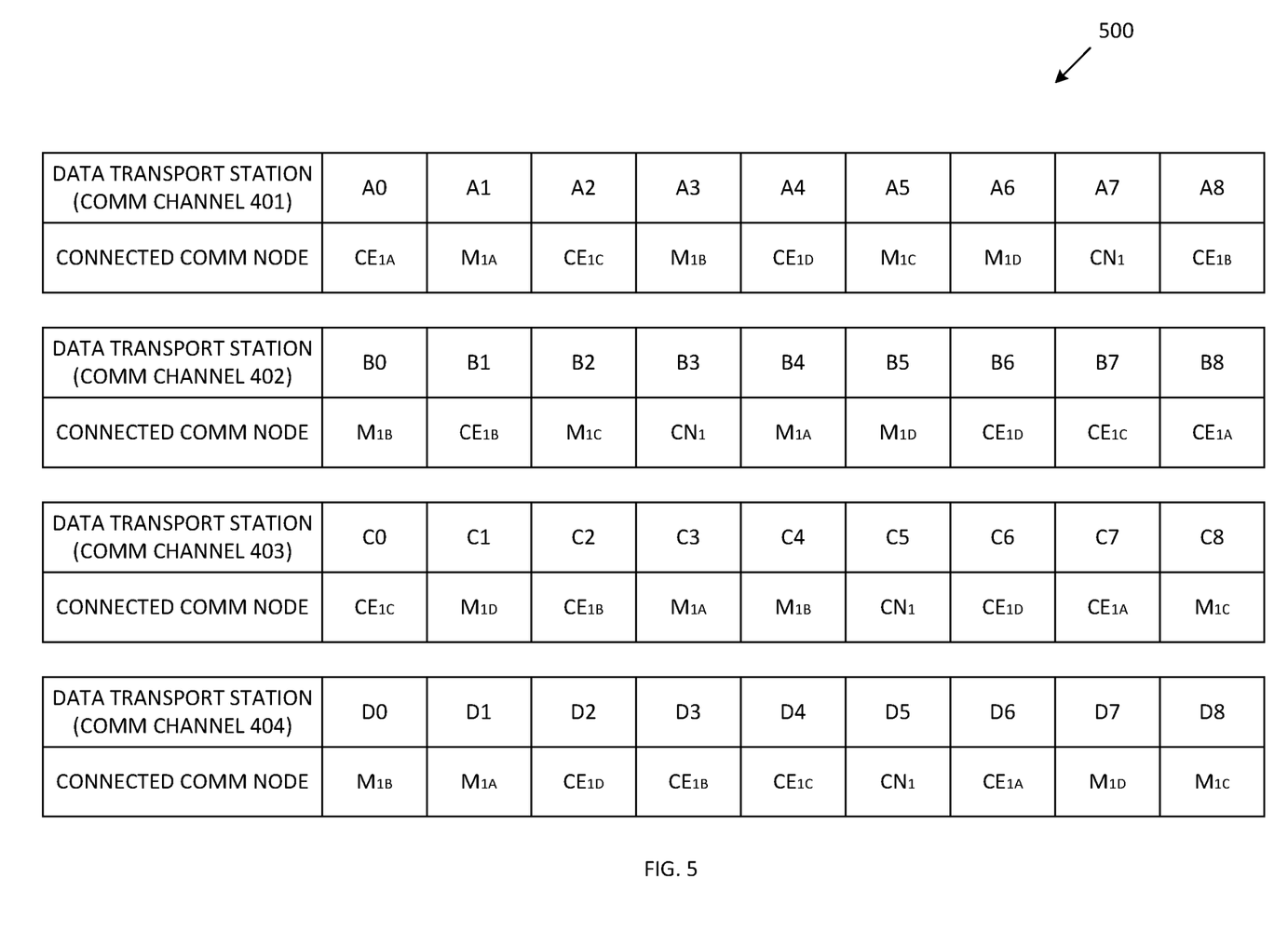
FIG. 5 is an interconnect matrix of the four communication channels of the first level permutated ring network of FIG. 4, in accordance with one embodiment of the present invention.

FIG. 5 re-orders the data of Table 1 to provide an interconnect matrix 500 of the four communication channels 401-404, wherein the interconnect matrix 500 is ordered by the data transport stations in each of the communication channels 401-404. This interconnect matrix 500 makes it easy to determine the number of hops between communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$, on each of the communication channels 401-404. Note that communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$, are coupled to data transport stations having different relative positions in the four communication channels 401-404. As described in more detail below, this configuration allows for the versatile and efficient routing of messages between the communication nodes.

Figure 6:
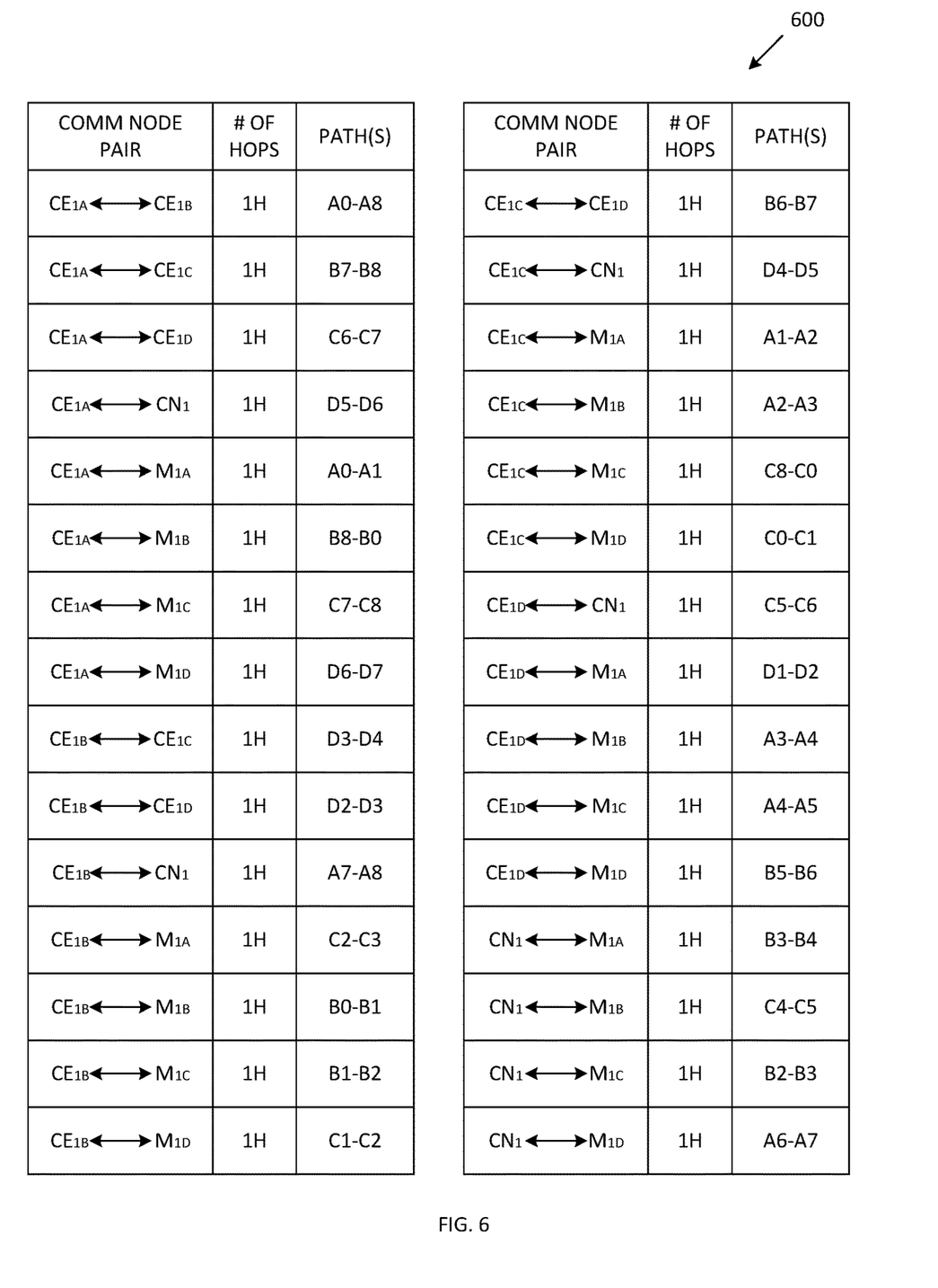
FIG. 6 is a routing table that defines the flow of traffic one the permutated ring network of FIG. 4 in accordance with one embodiment of the present embodiment.

FIG. 6 is a routing table 600, which defines the flow of traffic among communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$, through the permutated ring network 11 in accordance with the present embodiment. For example, communication node $CN_1$ and compute engine $CE_{1A}$ communicate using the path between data transport stations D5 and D6 on communication channel 404. The number of hops along this path is defined by the number of segments traversed on the communication channel 404. Because data transport stations D5 and D6 are adjacent to one another on communication channel 404 (i.e., one segment exists between data transport stations D5 and D6), the communication path between communication node $CN_1$ and compute engine $CE_{1A}$ consists of one hop (1H).

As illustrated by routing table 600, all of the relevant communication paths between communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$ include unique one hop communication paths. In other embodiments, one or more of the communication paths may include more than one hop. In yet other embodiments, multiple communication paths may be provided between one or more pairs of communication node $CN_1$, compute engines $CE_{1A}$, $CE_{1B}$, $CE_{1C}$ and $CE_{1D}$ and memory banks $M_{1A}$, $M_{1B}$, $M_{1C}$ and $M_{1D}$. In other embodiments, different pairs of communication nodes can share the same communication paths.

Communication among the data transport stations A0-A8, B0-B8, C0-C8 and D0-D8 will operate at the highest frequency allowed by the source synchronous network. This frequency is not reduced as the number of communication nodes and the number of communication channels scale up. It is understood that each of the communication channels 401-404 includes provisions for initialization, arbitration, flow control and error handling. In one embodiment, these provisions are provided using well established techniques.

Each of compute engines $CE_{1A}$, $CE_{1B}$, $CE_{1C}$ and $CE_{1D}$ and memory banks $M_{1A}$, $M_{1B}$, $M_{1C}$ and $M_{1D}$ transmits messages (which may include data) on permutated ring network 11 in accordance with the routing table 600. For example, compute engine $CE_{1A}$ may transmit a data request message to memory bank $M_{1C}$ using communication channel 404. More specifically, compute engine $CE_{1A}$ may transmit a data request message to the clockwise transmit path of data transport station C7. This data request message addresses data transport station C8 and memory bank $M_{1C}$. Upon receiving the data request message, data transport station C8 determines that the data request message addresses memory bank $M_{1C}$, and forwards the data request message to memory bank $M_{1C}$. After processing the data request message, memory bank $M_{1C}$ may transmit a data response message to the counterclockwise transmit path of data transport station C8. This data response message addresses data transport station C7 and compute engine $CE_{1A}$. Upon receiving the data response message, data transport station C7 determines that the data response message addresses compute engine $CE_{1A}$, and forwards the data response message to compute engine $CE_{1A}$.

Messages can be transmitted into and out of permutated ring network 11 through communication node $CN_1$. For example, compute engine $CE_{1A}$ of slice 1 may transmit a data request message to memory bank $M_{2A}$ of computing slice 2 using communication channel 404. More specifically, compute engine $CE_{1A}$ may transmit a data request message to the counterclockwise transmit path of data transport station D6. This data request message addresses data transport station D5 and communication node $CN_1$ (as well as communication node $CN_2$ of computing slice 2 and memory bank $M_{2A}$ within computing slice 2). Upon receiving the data request message, data transport station D5 determines that the data request message addresses communication node $CN_1$, and forwards the data request message to communication node $CN_1$. In response, communication node $CN_1$ determines that the data request message addresses communication node $CN_2$ within computing slice 2, and forwards the data request message on second level PRN interconnect 21 (using a routing table implemented by second level PRN interconnect 21). Note that second level PRN interconnect 21 uses a PRN structure similar to first level PRN interconnect 11 to route messages among communication nodes $CN_1$-$CN_6$. Note that the implementation of second level PRN interconnect 21 may be different than the implementation of first level PRN interconnect 11 (e.g., different number of communication channels, different routing table), due to the different number of communication nodes serviced by the second level PRN interconnect 21. In accordance with one embodiment, the second level PRN-based interconnect structure 21 includes three communication channels (i.e., three bi-directional ring networks), wherein each communication channel includes six data transport stations. In this embodiment, each of the communication nodes $CN_1$-$CN_6$ is coupled to a corresponding one of the data transport stations in each of the three communication channels.

The data transport station associated with communication node $CN_2$ receives the data request message transmitted on second level PRN interconnect 21, and determines that the data request message addresses communication node $CN_2$, and forwards the data request message to communication node $CN_2$. In response, communication node $CN_2$ determines that the data request message addresses memory bank $M_{2A}$ within computing slice 2, and forwards the data request message on the first level PRN interconnect 12 (using the routing table implemented by the first level PRN interconnect 12). Note that the first level PRN interconnect 12 uses a PRN structure similar to first level PRN interconnect 11 to route messages among communication nodes $CN_2$, compute engines $CE_{2A}$, $CE_{2B}$, $CE_{2C}$, $CE_{2D}$ (of compute engine set $CE_2$), and memory banks $M_{2A}$, $M_{2B}$, $M_{2C}$ and $M_{2D}$ (of memory bank set $M_2$).

The data transport station associated with memory bank $M_{2A}$ receives the data request message transmitted on first level PRN interconnect 12, and determines that the data request message addresses memory bank $M_{2A}$, and forwards the data request message to memory bank $M_{2A}$. Memory bank $M_{2A}$ may then respond to the data request message. For example, memory bank $M_{2A}$ may retrieve a stored data value and return this data value to compute engine $C_{1A}$ using a data response message. This data response message is transmitted to compute engine $C_{1A}$ using the reverse path of the original data request message.

In accordance with one embodiment, the third level PRN-based interconnect structure 31 includes three communication channels (i.e., three bi-directional ring networks), wherein each communication channel includes six data transport stations. In this embodiment, each of the communication nodes $CN_{11}$-$CN1_6$ is coupled to a corresponding one of the data transport stations in each of the three communication channels.

Using the above-described flat computer architecture and messaging system, messages can be transmitted between any of the various elements of computer system 200 via the first, second and third level PRN interconnect structures, without requiring a change in the messaging protocol. In accordance with one embodiment, each of the elements of computer system 200 is assigned a unique (system) address. Address mapping the various elements of the system 200 in this manner allows these elements to be consistently accessed across the first, second and third level PRN interconnect structures. Note that the computer system 200 is a non-coherent system, because this computer system 200 does not explicitly ensure the coherency of data stored by the memory banks within the computing slices, DRAM 211-214 or system memory 206. Instead, the user is required to control the data stored by these memories in the desired manner. Computer system 200 is therefore well suited to implement a Producer-Consumer execution model, such as that implemented by the forward propagation of a neural network. That is, computer system 200 is able to efficiently process data in neural network/machine learning applications. The improved network topology of computer system 200 is advantageously able to span multiple chips, without requiring cache coherency protocol between the multiple chips. Computer system 200 is therefore easily scalable, and capable of providing communication between many different chips.

In the embodiments described above, the first, second and third level interconnect structures 11, 21 and 31 are all implemented using bi-directional source synchronous permutated ring networks. However, in an alternate embodiment of the present invention, the first level interconnect structures can be implemented using a non-PRN based structure.

Figure 7:
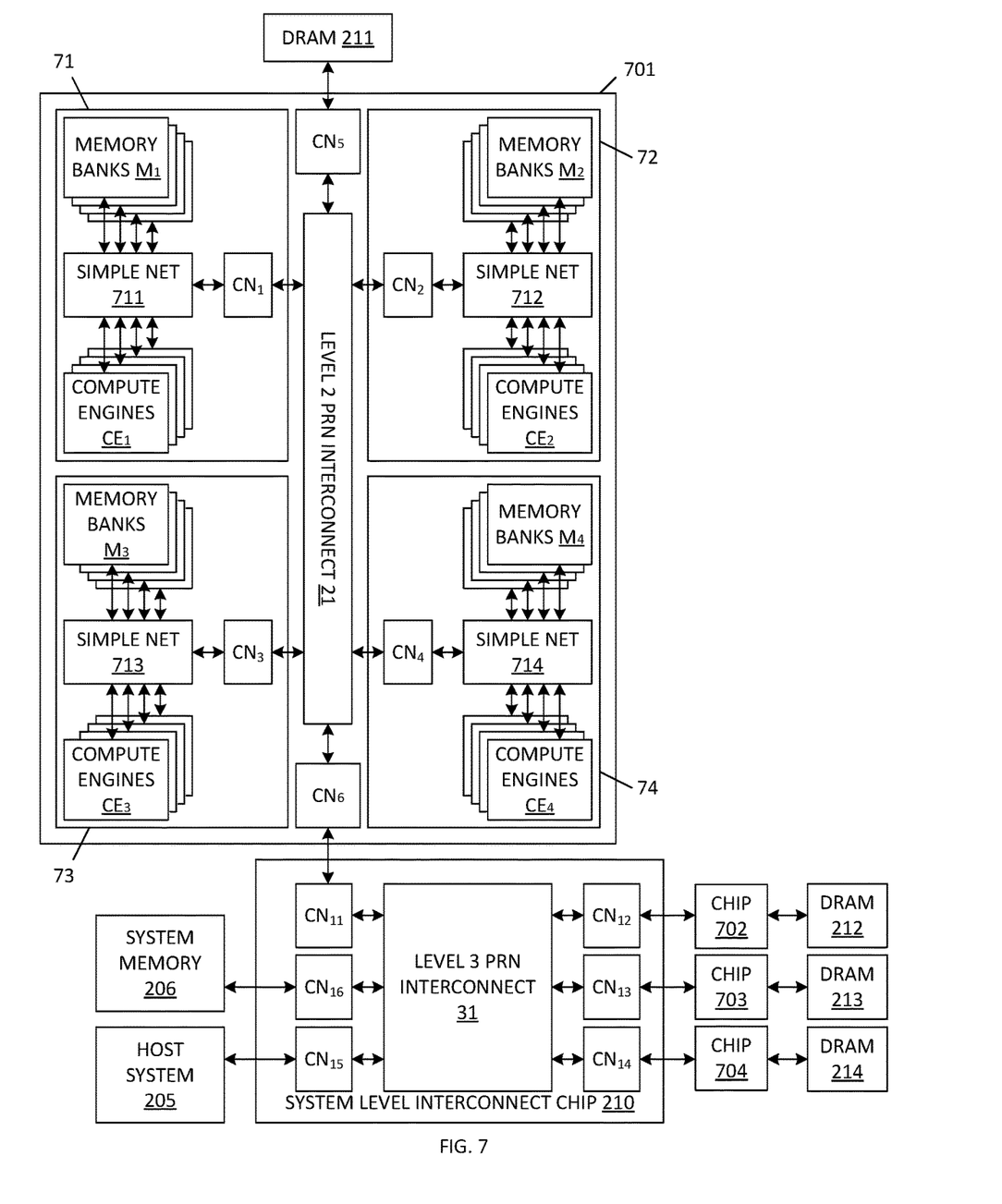
FIG. 7 is a block diagram of a computer architecture in accordance with an alternate embodiment of the present invention.

FIG. 7 is a block diagram of a computer system 700 in accordance with an alternate embodiment of the present invention. Because computer system 700 is similar to computer system 200, similar elements in FIGS. 7 and 2 are labeled with similar reference numbers. Thus, computer system 700 includes a plurality of processor chips 701-704, host processor system 205, system memory 206, system level interconnect chip 210 and DRAM devices 211-214. Although only four processor chips 701-704 are illustrated in FIG. 7, it is understood that computer system 700 can be easily modified to include other numbers of processor chips in other embodiments. Moreover, although only processor chip 701 is illustrated in detail in FIG. 7, it is understood that processor chips 702-704 include the same (or similar) internal elements as the processor chip 701 in the described embodiments. As described in more detail below, processor chip 701 replaces the first level PRN-based interconnect structures 11-14 of processor chip 201 with simple network interconnect structures 711-714. Simple network interconnect structures 711-714 can be, for example, crossbar switch-based interconnect structures, or simple ring networks.

In the illustrated embodiment, processor chip 701 includes four computing slices 71, 72, 73, and 74, which are coupled to second level permutated ring network interconnect structure 21. Although four computing slices are illustrated in FIG. 7, it is understood that other numbers of computing slices can be included on processor chip 701 in other embodiments. Each computing slice includes a plurality of compute engines, a plurality of memory banks, a communication node and a simple network interconnect structure. More specifically, slices 71, 72, 73 and 74 include compute engine sets $CE_1$, $CE_2$, $CE_3$ and $CE_4$, respectively, memory bank sets $M_1$, $M_2$, $M_3$ and $M_4$, respectively, simple network interconnect structures 711, 712, 713 and 714, respectively, and communication nodes $CN_1$, $CN_2$, $CN_3$ and $CN_4$, respectively. Compute engine sets $CE_1$, $CE_2$, $CE_3$ and $CE_4$ and memory bank sets $M_1$, $M_2$, $M_3$ and $M_4$ are described in more detail above in connection with FIGS. 2 and 3.

Within each of the slices 71, 72, 73 and 74, the corresponding simple network interconnect structures 711, 712, 713 and 714 couple the corresponding compute engine sets $CE_1$, $CE_2$, $CE_3$ and $CE_4$ and the corresponding memory bank sets $M_2$, $M_2$, $M_3$ and $M_4$. This allows each of the compute engines to access each of the memory banks within the same slice using the corresponding simple network.

The simple network interconnect structures 711, 712, 713 and 714, are also coupled to corresponding communication nodes $CN_1$, $CN_2$, $CN_3$ and $CN_4$ within the corresponding computing slices 71, 72, 73 and 74. The communication nodes $CN_1$, $CN_2$, $CN_3$ and $CN_4$ are coupled to the second level PRN-based interconnect structure 21 in the manner described above. The communication nodes $CN_1$, $CN_2$, $CN_3$ and $CN_4$ pass messages and data between the corresponding simple network interconnect structures 711, 712, 713 and 714 and the second level PRN-based interconnect structure 21. Note that messages transmitted between the simple network interconnect structures 711, 712, 713 and 714 and the corresponding communication nodes $CN_1$, $CN_2$, $CN_3$ and $CN_4$ must be converted to a protocol consistent with the receiving system. Such conversions may be implemented by an interface within simple network interconnect structures 711-714, or an interface within communication nodes $CN_1$, $CN_2$, $CN_3$ and $CN_4$. While this protocol conversion complicates the operation of computer system 700, it allows the use of simple network interconnect structures within each computing slice, which may reduce the required layout area of the computing slices 71-74.

Figure 8:
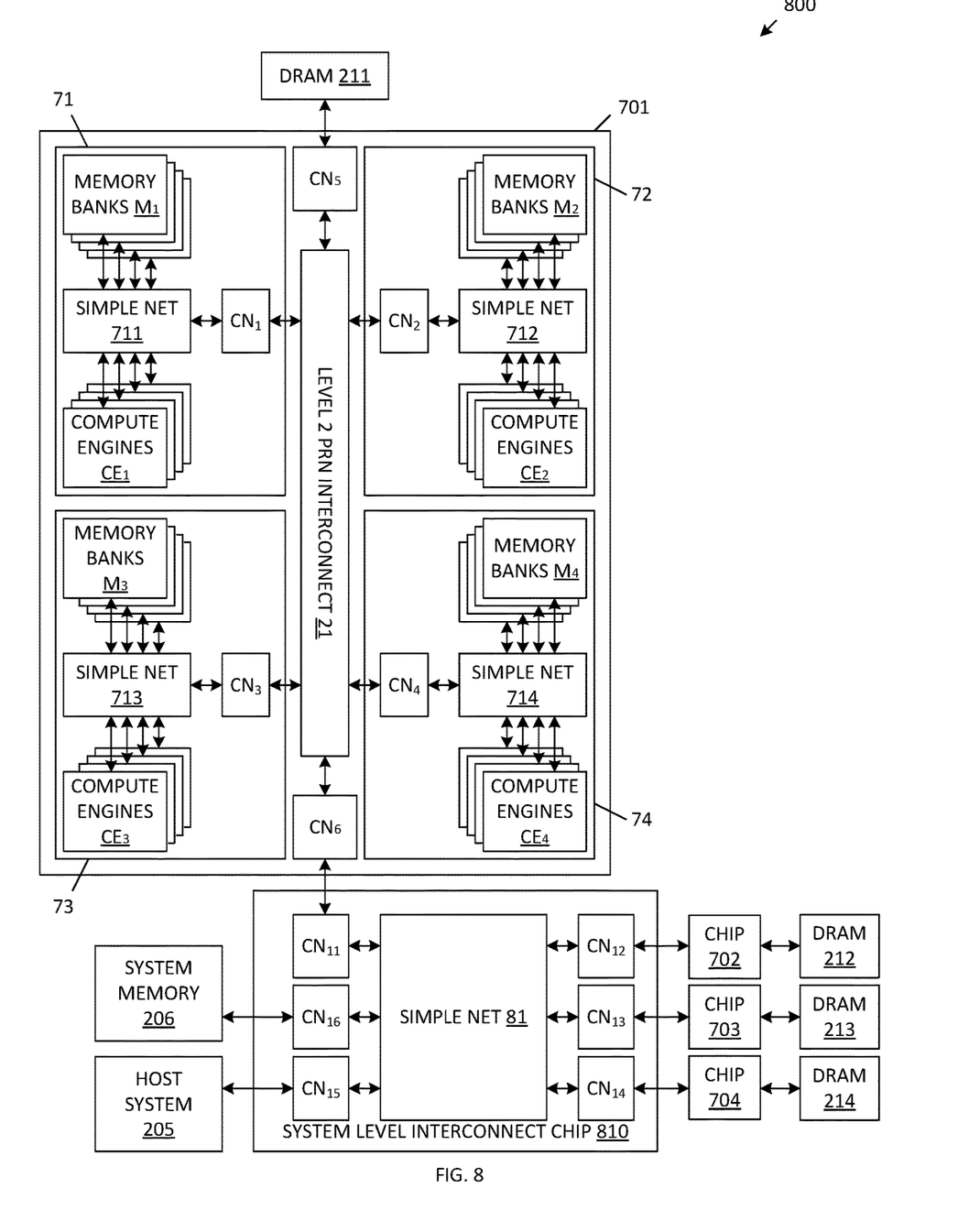
FIG. 8 is a block diagram of a computer architecture in accordance with another alternate embodiment of the present invention.

In another embodiment of the present invention, the third level PRN based interconnect structure 31 is replaced with a simple network interconnect structure, such as a crossbar switch based interconnect structure or a simple ring network (in the same manner that the first level PRN-based structures 11-14 are replaced by simple network structures 711-714 in FIG. 7 above). FIG. 8 is a block diagram of a computer system 800 in accordance with this alternate embodiment, which replaces the third level PRN based interconnect structure 31 with a simple network interconnect structure 81 on a system level interconnect chip 810 in the manner suggested above. The simple network interconnect structure 81, which can include, for example, a crossbar switch based interconnect structure or a simple ring network, provides connections between communication nodes $CN_{11}$-$CN_{16}$. Note that messages transmitted between processor chips 701-704, host processor system 205 and system memory 206 and the corresponding communication nodes $CN_{11}$, $CN_{12}$, $CN_{13}$, $CN_{14}$, $CN_{15}$ and $CN_{16}$ must be converted to protocols consistent with the receiving systems. Such conversions may be implemented by and interface within simple network interconnect structure 81, or interfaces within communication nodes $CN_{11}$-$CN_{16}$. While this protocol conversion complicates the operation of computer system 800, it allows the use of simple network interconnect structures within system level interconnect chip 810.

Although the simple network interconnect structure 81 of system level interconnect chip 810 is shown in combination with computing slices 71-74 having simple network interconnect structures 711-713, it is understood that the simple network interconnect structure 81 of system level interconnect chip 810 can also be used in combination with computing slices 1-4 having first level PRN-based interconnect structures 11-14, as illustrated by FIG. 2.

Several factors can be used to determine whether the first and third level interconnect structures should be implemented with a bi-directional source synchronous permutated ring networks (FIGS. 2A-2B) or simple network interconnect structures, such a crossbar switches or single ring networks (FIGS. 7-8). Permutated ring networks will provide better performance (but require a larger layout area) than a simple single ring network. Permutated ring networks will also typically provide better performance (and may require a larger layout area) than a crossbar switch. In general, as more communication nodes are connected by the interconnect structure, it becomes more efficient (in terms of layout area and performance) to use permutated ring networks instead of single ring networks or crossbar switches. In accordance with one embodiment, permutated ring networks are used when the number of communication nodes to be connected is four or greater.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

I claim:

1. A computer architecture comprising:
   a plurality of computing slices, each including a plurality of compute engines, a plurality of memory banks, a communication node and a first-level interconnect structure coupling each of the plurality of compute engines, the plurality of memory banks and the communication node; and
   a second-level interconnect structure that includes a permutated ring network having a plurality of bi-directional source-synchronous ring networks, each including a plurality of data transport stations, wherein each communication node of the plurality of computing slices is coupled to one of the data transport stations in each of the plurality of bi-directional source-synchronous ring networks.

2. The computer architecture of claim 1, wherein each first-level interconnect structure includes a slice-level permutated ring network having a plurality of bi-directional source-synchronous ring networks, each including a plurality of data transport stations, wherein each of the plurality of compute engines, the plurality of memory banks, and the communication node of the corresponding computing slice is coupled to one of the data transport stations in each of the plurality of bi-directional source-synchronous ring networks of the slice-level permutated ring network.

3. The computer architecture of claim 1, wherein each first-level interconnect structure includes a crossbar switch coupled to the plurality of compute engines, the plurality of memory banks, and the communication node of the corresponding computing slice.

4. The computer architecture of claim 1, wherein each first-level interconnect structure includes a ring network coupled to the plurality of compute engines, the plurality of memory banks, and the communication node of the corresponding computing slice.

5. The computer architecture of claim 1, further comprising:
   a memory interface communication node coupled to the second-level interconnect structure, wherein the memory interface communication node is coupled to one of the data transport stations in each of the plurality of bi-directional source-synchronous ring networks; and
   a memory device coupled to the memory interface communication node.

6. The computer architecture of claim 5, wherein the memory device is a dynamic random access memory (DRAM) device.

7. The computer architecture of claim 1, further comprising a first network communication node coupled to the second-level interconnect structure, wherein the first network communication node is coupled to one of the data transport stations in each of the plurality of bi-directional source-synchronous ring networks of the second-level interconnect structure.

8. The computer architecture of claim 7, further comprising a system-level interconnect structure coupled to the first network communication node.

9. The computer architecture of claim 8, wherein the system-level interconnect structure comprises a plurality of network communication nodes coupled to a third-level interconnect structure, wherein a first one of the plurality of network communication nodes is coupled to the first network communication node.

10. The computer architecture of claim 9, further comprising a host system processor coupled to a second one of the plurality of network communication nodes.

11. The computer architecture of claim 10, further comprising a system memory coupled to a third one of the plurality of network communication nodes.

12. The computer architecture of claim 8, further comprising a
   a second plurality of computing slices, each including a second plurality of compute engines, a second plurality of memory banks, a second communication node and a second first-level interconnect structure coupling each of the second plurality of compute engines, the second plurality of memory banks and the second communication node;
   a second second-level interconnect structure that includes a second permutated ring network having a second plurality of bi-directional source-synchronous ring networks, each including a second plurality of data transport stations, wherein each second communication node of the second plurality of computing slices is coupled to one of the second data transport stations in each of the second plurality of bi-directional source-synchronous ring networks; and
   a second network communication node coupled to the second second-level interconnect structure, wherein the second network communication node is coupled to one of the data transport stations in each of the second plurality of bi-directional source-synchronous ring networks of the second second-level interconnect structure, wherein the second network communication node is coupled to the system-level interconnect structure.

13. The computer architecture of claim 9, wherein the third-level interconnect structure includes a system-level permutated ring network having a plurality of bi-directional source-synchronous ring networks, each including a plurality of data transport stations, wherein each of the plurality network communication nodes is coupled to one of the data transport stations in each of the plurality of bi-directional source-synchronous ring networks of the system-level permutated ring network.

14. The computer architecture of claim 9, wherein the third-level interconnect structure includes a crossbar switch coupled to the plurality of network communication nodes.

15. The computer architecture of claim 9, wherein the third-level interconnect structure includes a ring network coupled to the plurality of network communication nodes.

16. The computer architecture of claim 1, wherein each communication node includes a connection to each of the other communication nodes, wherein the connection includes a direct connection between adjacent data transport stations.

17. The computer architecture of claim 1, wherein a unique pair of adjacent data transport stations provides a connection between each pair of the communication nodes.

18. The computer architecture of claim 1, wherein the plurality of bi-directional source-synchronous ring networks operate in a first clock domain, and the plurality of compute engines and the plurality of memory banks operate in a second clock domain, different than the first clock domain.

19. The computer architecture of claim 1, wherein the plurality of computing slices and the second level interconnect structure are located on the same semiconductor chip.

* * * * *